(12) United States Patent
Nevill (10) Patent No.: US 6,910,206 B1
(45) Date of Patent: Jun. 21, 2005

(54) DATA PROCESSING WITH NATIVE AND INTERPRETED PROGRAM INSTRUCTION WORDS

(75) Inventor: Edward Colles Nevill, Huntingdon (GB)

(73) Assignee: Arm Limited, Cambridge (GB)

( * ) Notice: Subject to any disclaimer, the term of this patent is extended or adjusted under 35 U.S.C. 154(b) by 542 days.

(21) Appl. No.: 09/706,867

(22) Filed: Nov. 7, 2000

(30) Foreign Application Priority Data

Jan. 17, 2000 (GB) ................................................ 001030

(51) Int. Cl.$^7$ ................................................ G06F 9/45
(52) U.S. Cl. .................. 717/153; 712/209; 718/100; 717/139
(58) Field of Search ................................ 717/139, 153; 718/100; 712/209, 245, 300, 244; 709/100, 310, 107

(56) References Cited

U.S. PATENT DOCUMENTS

| | | | | |
|---|---|---|---|---|
| 6,081,665 A | * | 6/2000 | Nilsen et al. | 717/116 |
| 6,151,703 A | * | 11/2000 | Crelier | 717/136 |
| 6,256,658 B1 | * | 7/2001 | Mourey et al. | 709/100 |
| 6,415,381 B1 | * | 7/2002 | Bak et al. | 712/244 |
| 6,513,156 B2 | * | 1/2003 | Bak et al. | 717/151 |
| 6,553,426 B2 | * | 4/2003 | Holzle et al. | 709/310 |
| 6,564,241 B1 | * | 5/2003 | Rosengard | 709/107 |
| 6,578,193 B1 | * | 6/2003 | Adams | 717/139 |
| 2003/0191792 A1 | * | 10/2003 | Waki et al. | 709/100 |

OTHER PUBLICATIONS

Azevedo, Ana, Nicolau, Alex, "JAVA Annottion–Aware Just–In–Time (AJIT) Compilation System", ACM 1999, 5/99/06, p. 142–151, retrieved from ACM Portal database Oct. 16, 2003.*

Hsieh, Cheng–Hsueh A., Gyllenhaal, John C., Hwu, Wen–mei, "JAVA Bytecode to Native Code Translation: The Caffeine Prototype and Preliminary Results", 1996 IEEE, p. 90–97, retrieved from IEEE database Oct. 16, 2003.*

* cited by examiner

Primary Examiner—Antony Nguyen-Ba
Assistant Examiner—Mary J Steelman
(74) Attorney, Agent, or Firm—Nixon & Vanderhye P.C.

(57) ABSTRACT

An interpreter invocation mechanism for switching between execution of native instruction words to interpreted instruction words uses a subroutine call instruction to start execution of the interpreter. The return address of the subroutine call instruction is used as an address pointer to the start of the interpreted code. The interpreted code may terminate with an Exit instruction whereupon normal native code execution resumes using the instruction at the immediately following memory address or alternatively with a Return instruction that recovers a return address previously stored to stack memory.

19 Claims, 4 Drawing Sheets

DATA PROCESSING WITH NATIVE AND INTERPRETED PROGRAM INSTRUCTION WORDS

BACKGROUND OF THE INVENTION

Field of the Invention

This invention relates to the field of data processing systems. More particularly, this invention relates to data processing system operating under control of a mix of native and interpreted program instruction words.

BACKGROUND

Computer programs or subroutines written in the form of interpreted program instructions words are typically smaller in size than the same computer programs or subroutines written in the form of native programs instruction words. High code density is desirable as it reduces system memory requirements. However, computer programs or subroutines written in the form of interpreted program instruction words are typically slower to execute than the same computer programs or subroutines written in the form of native program instruction words due to the additional processing overhead associated with interpretation. The different characteristics of computer programs or subroutines written in these two ways has the result that it is desirable to be able mix the two types of program words and rapidly and efficiently switch between them.

When executing a portion of a computer program in the form of native program instruction words and it is desired to switch to executing interpreted program instruction words, then the instruction interpreter must be invoked and passed the location of the interpreted program instruction words. It is often not possible or desirable to add a special purpose native program instruction task and so several native program instruction words have to be used to perform the switch. The use of several native program words to perform the switch is disadvantageously slow and uses extra memory capacity.

SUMMARY

Viewed from one aspect the invention provides apparatus for processing data under control of a computer program, said apparatus comprising:
(i) a processing unit responsive to native program instruction words to perform data processing operations;
(ii) an instruction interpreter responsive to one or more interpreted instruction words specifying a data processing operation to execute native instruction words upon said processing unit to perform said data processing operation; and
(iii) a memory for storing said computer program; wherein
(iv) said computer program includes both native instruction words and interpreted instruction words;
(vi) a native code portion invokes interpretation of an interpreted code portion by executing a native code call instruction to said instruction interpreter;
(vii) a return address is generated during execution of said native code call instruction, said return address specifying a location within said memory for said native code call instruction; and
(viii) said instruction interpreter uses said return address as a pointer to said interpreted code portion within said memory.

Viewed from another aspect the invention provides a method of processing data under control of a computer program, said method comprising the steps of:
(i) in response to native program instruction words, performing data processing operations with a processing unit;
(ii) in response to one or more interpreted instruction words specifying a data processing operation, executing with an instruction interpreter native instruction words upon said processing unit to perform said data processing operation; and
(iii) storing said computer program in a memory; wherein
(iv) said computer program includes at least one native code portion and at least one interpreted code portion;
(vi) a native code portion invokes interpretation of an interpreted code portion by executing a native code call instruction to said instruction interpreter;
(vii) generating a return address during execution of said native code call instruction, said return address specifying a location within said memory for said native code call instruction; and
(viii) said instruction interpreter uses said return address as a pointer to said interpreted code portion within said memory.

Using a native code call instruction, as is normally provided in the instruction is set, to call/invoke the interpreter avoids the need for a special purpose native program instruction word to perform the switch. The location of the interpreted program instruction words is passed to the interpreter in the return address of the native code call instruction and so only a single native code instruction is needed to make the switch.

Whilst it is possible to do otherwise, it is preferred that said return address is an address immediately succeeding an address of said native code call instruction within said memory.

As the return address points to the interpreted program instruction words, then these will normally be provided immediately following the native code call instruction.

In order to manage the switch back to native code program instruction words, one preferred arrangement is that said instruction interpreter writes a new value of said return address for use by a native code return instruction as a pointer to a next native code instruction to be executed when interpretation of said interpreted code portion is finished and return is being made to execution of said next native code portion of said computer program.

In accordance with the above, the return to native code execution may be made by an arrangement that said interpreted code portion finishes with an interpreted return instruction that returns execution to a native code portion at an address pointed to by said return address.

As an alternative, in some situations it may be preferred that said interpreted code portion finishes with an interpreted exit instruction that results in execution of a next native code portion stored within said memory at an address immediately following said exit instruction without a return being made corresponding to said native code call instruction.

It is common for call return addresses to be stored in stack memory, however in preferred embodiments said processing unit includes a bank of data processing registers and said return address is stored within a predetermined data processing register within said bank of data processing registers upon execution of said native code call instruction.

Having the return address in a register allows use and manipulation of this address to take place without the overhead of having to recover the address from stack memory.

Whilst having the return address available in a register for immediate use is an advantage, it is also sometimes desirable to release that register for other uses or to provide longer term storage of the return address. Accordingly, in preferred embodiments of the invention said memory includes a stack memory region and said return address is copied from said predetermined data processing register to said stack memory region upon invocation of said interpreted code portion.

The interpreter can be made more simple, compact and fast in preferred embodiments in which each interpreted code instruction word corresponds to a native code instruction word.

In practice the efficiency of the interpreter can be improved and the code density increased in preferred embodiments in which said native code instruction words form a native code instruction set and said interpreted code instruction words form an interpreted code instruction set, data processing operations provided by said interpreted code instruction set being a subset of data processing operations provided by said native code instruction set.

The interpretation simplicity and operationally efficiency are further improved in embodiments in which said native code instruction words are X-bit instruction words and said interpreted code instruction words are Y-bit instruction words, X being greater than Y.

Use of the full capabilities of the underlying data processing system may be maintained in preferred embodiments in which said native code instruction words specify N-bit data processing operations to be performed by said processing unit and said interpreted code instruction words specify N-bit data processing operations to be performed by said processing unit.

It is particularly convenient to provided systems in which X is equal to N.

Preferred embodiments that achieve a good balance of code density improvement against speed are ones in which Y is N/4.

Whilst it would be possible to provide a hardwired interpreter, flexibility is improved when said instruction interpreter is a software interpreter provided by an interpreter computer program formed of native code instruction words executed by said processing unit.

In preferred embodiments speed is improved when the software interpreter is stored in a cache memory. The speed of switching is improved when the software interpreter is locked down with the cache memory.

The overall efficiency of the system is improved in embodiments in which portions of said computer program having less than a threshold required execution speed are provided as interpreted code instructions words and portions of said computer program having greater than said threshold required execution speed are provided as native code instructions words.

The overall efficiency of the system is improved in embodiments in which portions of said computer program having less than a threshold execution frequency are provided as interpreted code instructions words and portions of said computer program having greater than said threshold execution frequency are provided as native code instructions words.

Viewed from another aspect the invention provides a method of processing data under control of a computer program, said method comprising the steps of:

(i) in response to native program instruction words, performing data processing operations with a processing unit;

(ii) in response to one or more interpreted instruction words specifying a data processing operation, executing with an instruction interpreter native instruction words upon said processing unit to perform said data processing operation; and (iii) storing said computer program in a memory; wherein (iv) said computer program includes at least one native code portion and at least one interpreted code portion;

(vi) a native code portion invokes interpretation of an interpreted code portion by executing a native code call instruction to said instruction interpreter;

(vii) execution of said native code call instruction triggers generation of a return address specifying a location within said memory for said native code call instruction; and (viii) said instruction interpreter uses said return address as a pointer to said interpreted code portion within said memory.

The above, and other objects, features and advantages of this invention will be apparent from the following detailed description of illustrative embodiments which is to be read in connection with the accompanying drawings.

DETAILED DESCRIPTION

Figure 1:
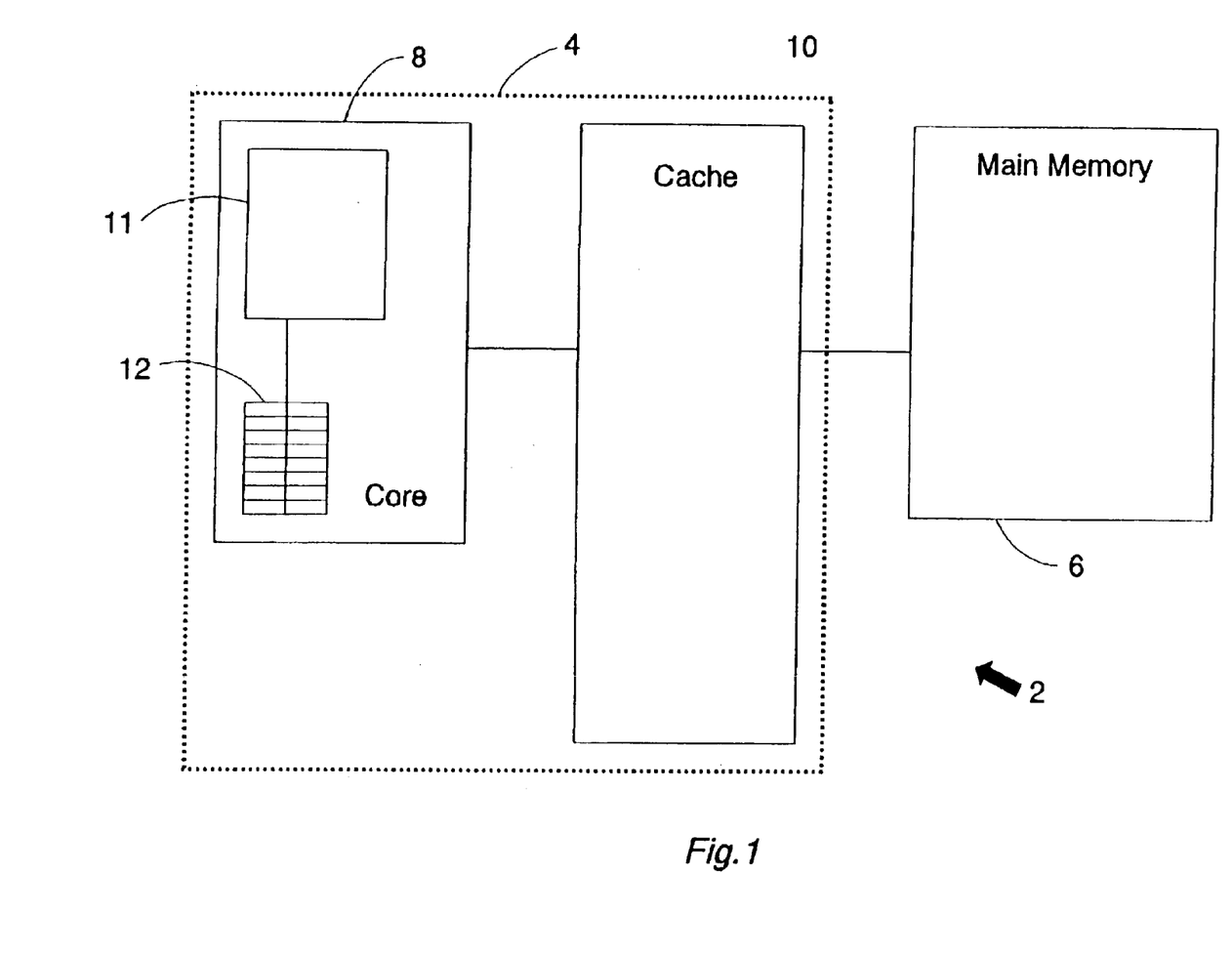
FIG. 1 is a schematic diagram of a data processing system.

FIG. 1 illustrates a data processing system 2 comprising an integrated circuit 4 coupled to a main memory 6. Within the integrated circuit 4 there is a processor core 8 and a cache memory 10. Within the processor core 8 there is an instruction decoding and control unit 11 coupled to a register bank 12. It will be appreciated that FIG. 1 is a highly schematic representation of a data processing system that will in practice contain many more parts.

The main memory 6 stores software programs and data to be processed. The processor core 8 fetches instruction words and data words from the main memory. The cache memory 10 disposed between the processor core 8 and the main memory 6 serves to provide high speed access to cached instruction words and data words in accordance with normal caching principles. The instruction decoding and controlling unit 11 responds to received native instruction words to perform data processing operations using data values held within the register bank 12. The native instruction words are directly decoded by the instruction decoder and control unit 10. Examples of native instruction word instruction sets are the ARM 32-bit instruction set and the Thumb 16-bit instruction set executed by Thumb enabled ARM processors produced by ARM Limited of Cambridge, England.

The software programs stored within the main memory 6 and executed by the data processing unit 4 comprise a mixture of native code and interpreted code. Native code typically provides the highest execution speed, but is generally less dense and so requires greater memory capacity. Conversely, interpreted code is generally slower to execute but has a higher density requiring less storage capacity. Accordingly, it will be appreciated that there are significant advantages to be gained in mixing native code and interpreted code such that frequently used and/or time critical portions of the software are written in native code whereas infrequently used and/or time non-critical portions are written in interpreted code. Using such a mixture of native code and interpreted code it is possible to achieve most of the speed of a pure native code program whilst significantly reducing the amount of storage capacity needed for the program by the use of more dense interpreted code for some portions of the program.

Known examples of interpreted program languages include Basic and Java. These high-level languages often produce highly dense code but require comparatively large, sophisticated and slow interpretation. In order to reduce the memory storage requirements for the interpreter and increase the speed of interpretation, the described embodiments utilize a special purpose interpreted instruction set called Photon. Each instruction in the Photon interpreted instruction set consists of one or more 8-bit instruction words. Substantially each of the Photon instruction words corresponds to a native instruction word within the ARM instruction set. As there are very many fewer available Photon instruction words, these are chosen such that they represent instruction words most frequently required or needing to be provided to achieve typical processing requirements. A small number of photon instruction words can be reserved for controlling the interpreter and other uses which do not have direct single equivalents in the native instruction words.

Providing substantially each of the Photon instruction words in a one-to-one correspondence with native instruction words simplifies the required interpreter such that this interpreter consumes relatively few resources and is able to operate rapidly and predictably. The interpreter may be a software interpreter or a hardware interpreter. Using the Photon instruction set, a hardware interpreter will have the advantage of requiring comparatively less storage space and a software interpreter will have the advantage of requiring comparatively fewer circuit elements.

The software interpreter is "locked-down" within the cache memory 10. Thus, when the software interpreter is first invoked it will be loaded into the cache memory 10 from the main memory 6 and thereafter remain within the cache memory 10 to be available for high speed use. Alternatively, the software interpreter may be pre-loaded into the cache memory 10 from the main memory 6 when the data processing system 2 is initialized. In either case, having a relatively small and efficient software interpreter that may be wholly stored within the cache memory 10 without consuming too great a proportion of the cache memory 10 is a strong performance advantage.

The software interpreter itself is formed of native instruction words and serves to parse the interpreted instruction words and map them to corresponding native instruction words. It will be appreciated that whilst substantially each Photon instruction word corresponds to an ARM instruction, the software interpreter may need to execute a few ARM instructions to set up the data in the correct registers and form prior to executing the ARM instruction that corresponds to the interpreted Photon instruction.

In order that the system may operate effectively, it is important to have an efficient mechanism for switching between the execution of native instruction words and the execution of interpreted instruction words. The native instruction words instruction set is often already fixed and so it is not possible to add a special purpose switching instruction to the native instruction set. Furthermore, bit-space within a native instruction set is often a critical resource and so adding a switching instruction would reduce the amount of this resource available for other uses.

Figure 2:
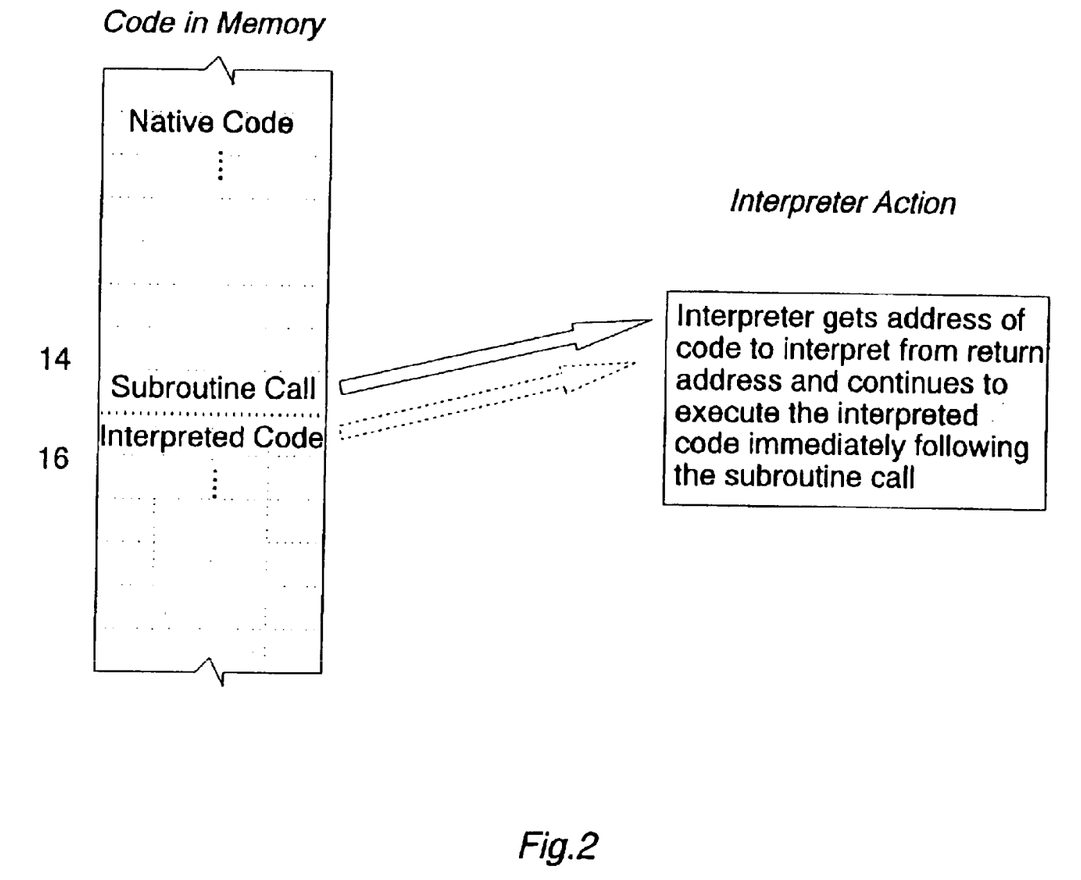
FIG. 2 schematically illustrates switching from native code to interpreted code.

FIG. 2 illustrates a technique for switching between execution of native instruction words and interpreted instruction words. The native instruction words include a subroutine call instruction that is normally used to jump to native code subroutines. When such a subroutine call is made, hardware mechanisms are already in place that store a return address for the call such that native code execution can be resumed at the instruction following the subroutine call once the subroutine has completed. The interpreter invocation mechanism illustrated in FIG. 2 uses a subroutine call 14 from the native code to the software interpreter code. The interpreted code 16 is stored in the memory locations immediately following the subroutine call. Accordingly, the return address stored in response to the subroutine call 14 corresponds to the memory location of the start of the interpreted code 16. Accordingly, the software interpreter reads the return address and uses this as a pointer to the interpreted code 16 which it is desired to execute. It will be seen from FIG. 2 that the native code comprises 32-bit native instruction words and the interpreted code comprises 8-bit interpreted instruction words, such that four interpreted instruction words can be stored in the same space that is required for a single native code instruction word. A single subroutine call instruction 14 is needed to perform the required switch to the start of execution of interpreted instruction words. The subroutine call instruction 14 is already provided within the native code instruction set and so no additional bit-space within the native code instruction set is consumed. Furthermore, if the native code instruction set is one that is already established, then no modifications need to be made to the native code instruction set or hardware to utilize the interpreted code invocation technique illustrated in FIG. 2.

Figure 3:
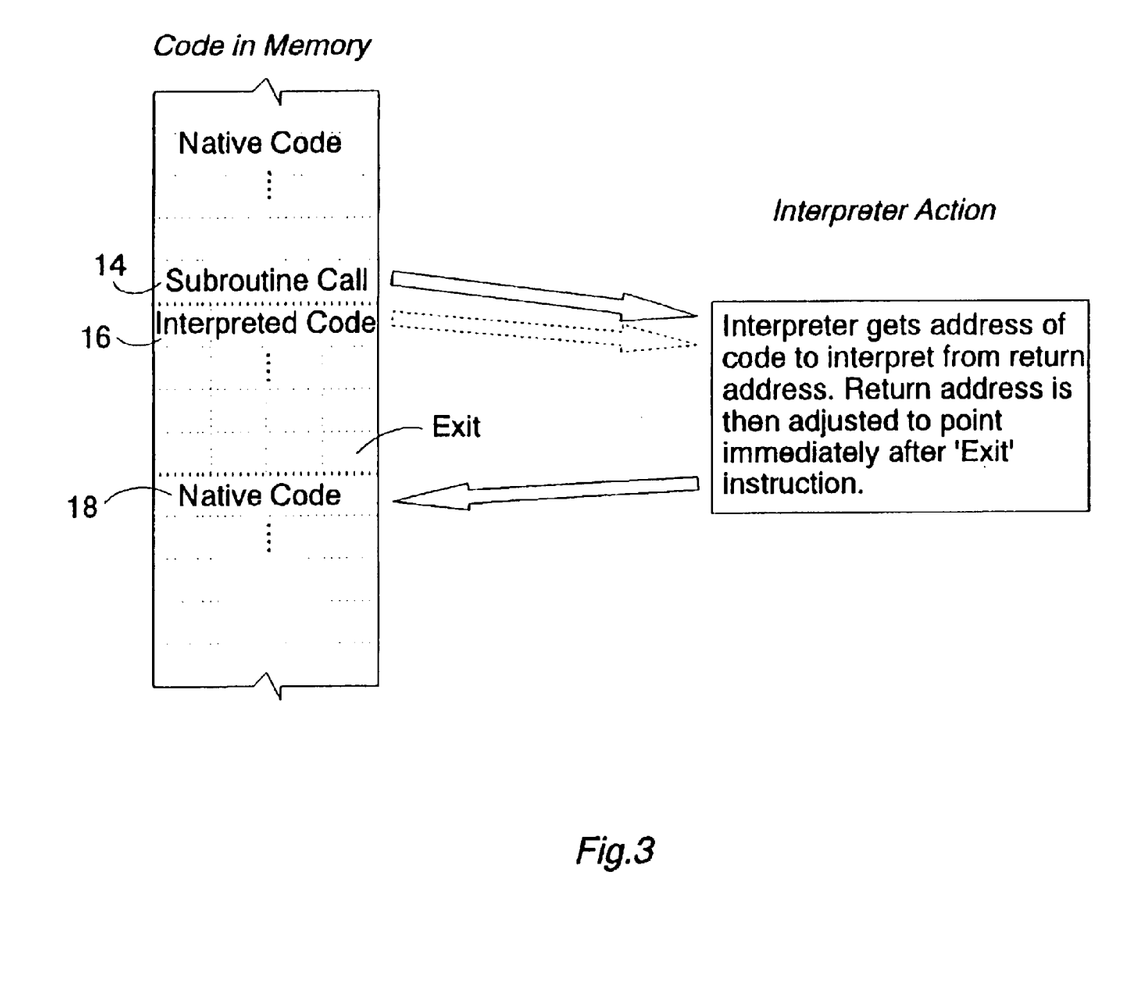
FIG. 3 illustrates a first mechanism for returning to native code execution from interpreted code execution.

FIG. 3 illustrates a first mechanism for returning to native code execution from interpreted code execution. A special purpose Exit instruction is provided within the interpreted code instruction set. The software interpreter is responsive to such an Exit instruction to simply cease interpretation of instruction words and instead pass control to the immediately following next native code instruction 18. Using this technique interpreted code can be freely mixed in with native code.

Figure 4:
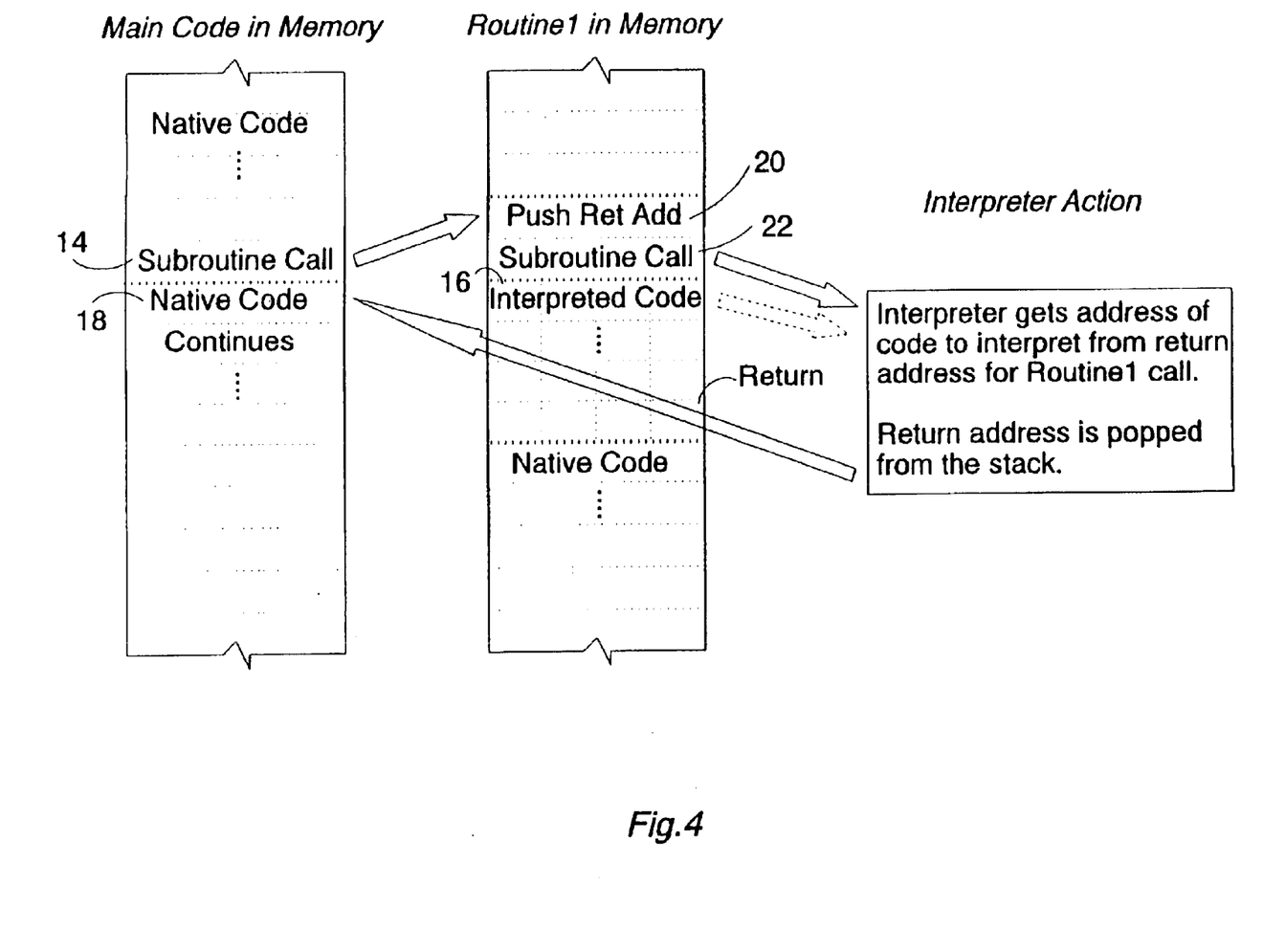
FIG. 4 illustrates an alternative way of invoking execution of interpreted code and a second mechanism for returning to native code execution from interpreted code execution.

FIG. 4 illustrates an alternative technique for invoking the software interpreter and a second mechanism for returning to native code execution from interpreted code execution. Whilst FIG. 3 allows interpreted code to be embedded within native code, it is not well suited to situations in which the interpreted code is genuinely a subroutine that it is desired to invoke from several different points within the native code of the program as a whole. FIG. 4 illustrates a solution to this problem. A subroutine call 14 is issued to a subroutine Routine1 in memory that appears to the overall native code program to be a native code subroutine in the normal way. The subroutine Routine1 stores the return address to the native code instruction 18 by pushing it to a stack memory area with native code instruction 20. The subroutine Routine1 then makes a second subroutine call 22 to the start address of the interpreter software. This second subroutine call invokes interpreted code execution in the same way as illustrated in FIG. 2 in that the return address from the subroutine call instruction 22 is used as a pointer to the start of the interpreted code 16.

At the end of the interpreted code there is a return instruction that is acted upon by the software interpreter to recover the return address from the subroutine call instruction 14 that was stored in the stack memory area The software interpreter then passes control using this recovered return address to the native code instruction 18 that is pointed to by the return address.

In this way, the interpreted code can effectively be treated as a normal native code subroutine by the rest of the native code program.

An alternative way of viewing the invention is set out as follows.

This describes a mechanism for invoking an interpreter to execute interpreted code. The mechanism uses a subroutine call followed immediately by the code to be interpreted. The interpreter uses the return address of the subroutine as the starting address of the code to be interpreted. If the interpreter needs to return from interpreting code it adjusts the return address to point to the end of the interpreted code so that on return from the interpreter, normal (native) program execution will continue at the instruction after the interpreted code.

Alternatively, if the interpreter needs to perform a return directly to the caller of the original function containing the interpreted code, it can pop the return frame from the stack. Execution will then continue at the instruction after the call to the function containing the interpreted code.

A code example of the mechanism illustrated in FIG. 2 using the ARM processor with the Photon interpreter is as follows:

| | | |
|---|---|---|
| CODE32 | | ; Instruct the assembler that what follows is ARM code. |
| BL PHOTON | Execute_Photon | ;Call the Photon interpreter ;Instruct the assembler that what follows is a Photon byte code |
| <Photon byte code inserted here> | | |

In the above code example the processor executes the first instruction (BL) as a native ARM instruction. The BL instruction (a subroutine call in ARM) invokes the interpreter which then executes then native ARM instructions necessary to interpret the bytes following the BL instruction as Photon byte code.

Benefits

Previously to invoke the interpret on a section of interpreted code the processor would have to load the address of the code to be executed into a register (say R0) and then call the interpreter. e.g.

| | |
|---|---|
| ADR | r0, Interpreted_code |
| BL | Execute_Photon |
| ... | |
| ;------------------------------------ | |
| Interpreted_Code | |
| <Interpreted code here> | |

With the "Interpreter Invocation Mechanism" the code to be interpreted can be placed immediately after the call to Execute$_{13}$ Photon. There is then no need to load R0 with the address of the code to be interpreted. This has the following benefits.

There is a saving of one instruction per interpreter invocation

There is no need to reserve a register to hold the address of the code to be interpreted. As the point of a subroutine call is often the point where the register pressure is greatest there may not normally be a free register available to use to point to the interpreted code. For example, in the above R0 is typically used to hold the 1$^{st}$ argument to the function.

A code example of the mechanism illustrated in FIG. 3 using the ARM processor with the Photon interpreter is as follows:

| | | |
|---|---|---|
| CODE32 | | ;Instruct the assembler that what follows is ARM code |
| BL PHOTON | Execute_Photon | ;Call the Photon interpreter ;Instruct the assembler that what follows is a Photon byte code |
| <Photon byte code inserted here > | | |
| EXIT | | ;Photon Exit interpreter instruction |
| CODE32 | | ;Instruct the assembler that what follows is ARM code |

As in the first example the processor executes the first 2 instructions as native ARM code and then invokes the interpreter to execute Photon code immediately following the BL.

Execution of Photon code by the interpreter continues until the interpreter encounters a Photon 'EXIT' instruction. The interpreter then takes its IP register (Interpreter Pointer) and uses this to return to the ARM instructions immediately following the Photon code.

Benefits

The use of an EXIT instruction within the interpreter allows the interpreter to return directly to the code after the interpreted code. This allows interpreted code to be intermingled with native code. The possible benefits of this are.

A compiler can choose to compile sections of C (or other high level language code) to either native machine code, or interpreted code depending on which is more efficient in terms of code size or performance.

In a further example a subroutine call is made to a 1$^{st}$ routine which is part of its entry sequence performs a subroutine call to invoke the interpreter. The interpreter then executes interpreted instructions in the 1$^{st}$ routine until it encounters an interpreted RETURN instruction. Rather than continuing execution after the RETURN instruction as in the example of the EXIT instruction above, it instead returns immediately to the caller of the 1$^{st}$ routine.

A code example of the mechanism illustrated in FIG. 4 using the ARM processor with the Photon interpreter is as follows:

| | | |
|---|---|---|
| CODE32 | | ;Instruct the assembler that follows is ARM code |
| <ARM code> | | |
| BL | Routine1 | ;Ordinary call to Routine1 |
| <ARM code> | | ;Execution continues here after execution of Routine1 |
| ;------------------------------------ | | |
| CODE32 | | ;Instruct the assembler that what follows is ARM code |
| STMDB | sp!, {sp, lr} | ;Save return address for this function and also save stack pointer to allow for stack unwinding |
| BL PHOTON | Execute_Photon | ;Call the Photon interpreter ;Instruct the assembler that what follows is a Photon byte code |
| <Photon byte code inserted here> | | |
| RETURN | | ;Photon RETURN interpreter instruction |

In this example an initial subroutine call is made to Routine1. Routine1 then performs an entry sequence which consists of a STMDB instruction which saves the link register (LR) and the stack pointer (SP). The link register contains the return address for the Routine.

Execution of a Photon code by the interpreter continues until the interpreter encounters a Photon RETURN instruction. The interpreter then pops the link register and stack pointer from the stack and moves the link register into the program counter (PC) by performing the following sequence

```
LDMIA      sp, {sp, lr}
BX         lr
```

This has the effect of returning to the instruction immediately following the original subroutine call to Routine1.

Benefits

The use of the Interpreter Invocation Mechanism in the entry sequence of a function combined with the RETURN interpreted instruction allows a function to be written in interpreted code but be transparently viewed from the rest of the system as though it were written in native code. This has the following benefits.

- A compiler can choose to compile entire functions in either native code or interpreted code depending on what is most efficient in terms of code density or performance without needing to know whether the target function is interpreted code or native code. Since, for languages such as C different functions may be compiled from separate source files at different times the compiler can not know whether the target function is interpreted code or native code
- As software is usually developed in a modular fashion with different developers working on different sections of code it eases the task of software development as individual software developers can choose to write code in either interpreted code or native code and know that software written by other developers can call their software regardless.

Further Benefits

The above examples show the benefits as applied to ARM and Photon. These benefits also apply to other architectures and other interpreted languages.

For example the benefits of the above would also apply to the Intel 80x86/Pentium architectures with Java as the interpreted language.

This would allow Java and C code to be intermixed freely. For example following a C Entry Point an Entry sequence could be executed followed by a call to a Java interpreter. A Java return instruction would return control to the instruction following the Java code.

Alternatively one could use the same idea with one of the 80x86/Pentium architectures with a BASIC languages such as Visual BASIC as the interpreted language.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. Apparatus for processing data under control of a computer program, said apparatus comprising:
   (i) a processing unit responsive to native program instruction words to perform data processing operations;
   (ii) an instruction interpreter responsive to one or more interpreted instruction words specifying a data processing operation to execute native instruction words upon said processing unit to perform said data processing operation; and
   (iii) a memory for storing said computer program; wherein
   (iv) said computer program includes both native instruction words and interpreted instruction words;
   (v) a native code portion invokes interpretation of an interpreted code portion by executing a native code call instruction to said instruction interpreter;
   (vi) a return address is generated during execution of said native code call instruction, said return address specifying a location within said memory for said native code call instruction; and
   (vii) said instruction interpreter uses said return address as a pointer to said interpreted code portion within said memory.

2. Apparatus as claimed in claim 1, wherein said return address is an address immediately succeeding an address of said native code call instruction within said memory.

3. Apparatus as claimed in claim 1, wherein said instruction interpreter writes a new value of said return address for use by a native code return instruction as a pointer to a next native code instruction to be executed when interpretation of said interpreted code portion is finished and return is being made to execution of said next native code portion of said computer program.

4. Apparatus as claimed in claim 3, wherein said interpreted code portion finishes with an interpreted return instruction that returns execution to a native code portion at an address pointed to by said return address.

5. Apparatus as claimed in claim 1, wherein said interpreted code portion finishes with an interpreted exit instruction that results in execution of a next native code portion stored within said memory at an address immediately following said exit instruction without a return being made corresponding to said native code call instruction.

6. Apparatus as claimed in claim 1, wherein said processing unit includes a bank of data processing registers and said return address is stored within a predetermined data processing register within said bank of data processing registers upon execution of said native code call instruction.

7. Apparatus as claimed in claim 6, wherein said memory includes a stack memory region and said return address is copied from said predetermined data processing register to said stack memory region upon invocation of said interpreted code portion.

8. Apparatus as claimed in claim 1, wherein each of a majority of interpreted code instruction words corresponds to a native code instruction word.

9. Apparatus as claimed in claim 8, wherein said native code instruction words form a native code instruction set and said interpreted code instruction words form an interpreted code instruction set, data processing operations provided by said interpreted code instruction set being a subset of data processing operations provided by said native code instruction set.

10. Apparatus as claimed in claim 1, wherein said native code instruction words are X-bit instruction words and said interpreted code instruction words are Y-bit instruction words, X being greater than Y.

11. Apparatus as claimed in claim 1, wherein said native code instruction words specify N-bit data processing operations to be performed by said processing unit and said interpreted code instruction words specify N-bit data processing operations to be performed by said processing unit.

12. Apparatus as claimed in claim 10, wherein said native code instruction words specify N-bit data processing operations to be performed by said processing unit and said interpreted code instruction words specify N-bit data processing operations to be performed by said processing unit and X is equal to N.

13. Apparatus as claimed in claim 12, wherein Y is N/4.

14. Apparatus as claimed in claim 1, wherein said instruction interpreter is a software interpreter provided by an interpreter computer program formed of native code instruction words executed by said processing unit.

15. Apparatus as claimed in claim 14, comprising a cache memory and wherein said software interpreter is, in use, stored within said cache memory.

16. Apparatus as claimed in claim 15, wherein said software interpreter is stored within said cache memory when said processing unit executes native program instruction words and when said processing unit executes interpreted program instruction words.

17. Apparatus as claimed in claim 1, wherein portions of said computer program having less than a threshold required execution speed are provided as interpreted code instruction words and portions of said computer program having greater than said threshold required execution speed are provided as native code instructions words.

18. Apparatus as claimed in claim 1, wherein portions of said computer program having less than a threshold execution frequency are provided as interpreted code instruction words and portions of said computer program having greater than said threshold execution frequency are provided as native code instruction words.

19. A method of processing data under control of a computer program, said method comprising the steps of:

(i) in response to native program instruction words, performing data processing operations with a processing unit;

(ii) in response to one or more interpreted instruction words specifying a data processing operation, executing with an instruction interpreter native instruction words upon said processing unit to perform said data processing operation; and (iii) storing said computer program in a memory; wherein (iv) said computer program includes at least one native code portion and at least one interpreted code portion;

(v) a native code portion invokes interpretation of an interpreted code portion by executing a native code call instruction to said instruction interpreter;

(vi) generating a return address during execution of said native code call instruction, said return address specifying a location within said memory for said native code call instruction; and (vii) said instruction interpreter uses said return address as a pointer to said interpreted code portion within said memory.

* * * * *